(12) United States Patent
Xu et al.

(10) Patent No.: US 11,595,737 B2
(45) Date of Patent: Feb. 28, 2023

(54) METHOD FOR EMBEDDING ADVERTISEMENT IN VIDEO AND COMPUTER DEVICE

(71) Applicant: Huawei Technologies Co., Ltd., Shenzhen (CN)

(72) Inventors: Wei Xu, Nanjing (CN); Clare Conran, Dublin (IE); Francois Pitié, Dublin (IE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/990,011

(22) Filed: Aug. 11, 2020

(65) Prior Publication Data
US 2020/0374600 A1 Nov. 26, 2020

Related U.S. Application Data

(63) Continuation of application No. PCT/CN2019/072103, filed on Jan. 17, 2019.

(30) Foreign Application Priority Data

Feb. 12, 2018 (CN) .......................... 201810147228.1

(51) Int. Cl.
*H04N 21/234* (2011.01)
*H04N 21/44* (2011.01)
(Continued)

(52) U.S. Cl.
CPC ........... *H04N 21/812* (2013.01); *G06F 17/15* (2013.01); *G06N 3/0454* (2013.01)

(58) Field of Classification Search
CPC ................... H04N 21/23424; H04N 21/812
See application file for complete search history.

(56) References Cited

U.S. PATENT DOCUMENTS 8,929,720 B2    1/2015 Popkiewicz et al.
2015/0078733 A1*  3/2015 Popkiewicz ........... G06Q 30/02
                                                    386/278
(Continued)

FOREIGN PATENT DOCUMENTS

CN    103297811 A    9/2013
CN    103873741 A    6/2014
(Continued)

OTHER PUBLICATIONS

Chang, C., "Virtual spotlighted advertising for tennis videos," J. Vis. Commun. Image R. 21, 2010, 18 pages.

*Primary Examiner* — Hsiungfei Peng
(74) *Attorney, Agent, or Firm* — Conley Rose, P.C.

(57) ABSTRACT

A method for embedding an advertisement in a video and a computer device, which is configured to: determine a target image, where the target image is an image that is in M frames of images of a target video and that includes a first print advertisement, and M is a positive integer; determine a target area, where the target area is an area in which the first print advertisement is located in the target image; insert a to-be-embedded second print advertisement into the target area to replace the first print advertisement; and convert a style of the target image in which the second print advertisement is embedded, where a style of the second print advertisement in the target image after style conversion is consistent with a style of an image pixel outside the area in which the second print advertisement is located in the target image.

20 Claims, 6 Drawing Sheets

(51) Int. Cl.
*H04N 21/81* (2011.01)
*G06N 3/04* (2006.01)
*G06N 3/08* (2006.01)
*G06Q 30/02* (2012.01)
*G06V 10/764* (2022.01)
*G06V 10/82* (2022.01)
*G06V 20/40* (2022.01)
*G06F 17/15* (2006.01)

(56) References Cited

U.S. PATENT DOCUMENTS

| | | | |
|---|---|---|---|
| 2016/0212455 A1* | 7/2016 | Manna | G06Q 30/02 |
| 2018/0122114 A1* | 5/2018 | Luan | H04N 21/812 |
| 2019/0108396 A1* | 4/2019 | Dal Mutto | G07G 1/0063 |
| 2019/0182494 A1* | 6/2019 | Li | H04N 21/23424 |

FOREIGN PATENT DOCUMENTS

| | | |
|---|---|---|
| CN | 104735465 A | 6/2015 |
| CN | 105657446 A | 6/2016 |
| CN | 106792007 A | 5/2017 |
| CN | 107341452 A | 11/2017 |
| CN | 107577985 A | 1/2018 |

* cited by examiner

Before an advertisement is embedded      After an advertisement is embedded

Image that already has a print advertisement

Image that is obtained after segmentation by using a Unet and is represented by a heat map

METHOD FOR EMBEDDING ADVERTISEMENT IN VIDEO AND COMPUTER DEVICE

CROSS-REFERENCE TO RELATED APPLICATIONS

This application is a continuation of International Patent Application No. PCT/CN2019/072103, filed on 17 Jan. 2019, which claims priority to Chinese Patent Application No. 201810147228.1, filed on Feb. 12, 2018. The disclosures of the aforementioned applications are hereby incorporated by reference in their entireties.

TECHNICAL FIELD

This application relates to the field of video processing technologies, and in particular, to a method for embedding an advertisement in a video and a computer device.

BACKGROUND

In a conventional video advertisement placement mode, a pre-movie advert is played at the beginning of a movie, or an advertisement is embedded in a video picture when the movie is paused, which is relatively obtrusive and blunt, is antipathetic to a user, and has a low advertising conversion rate (the advertising conversion rate refers to a conversion rate of netizens who enter a promotion website by clicking an advertisement).

In recent years, an advertisement embedding technology in which a commodity, a logo, or a poster picture of an advertiser is seamlessly stitched into a video picture gradually emerges and proliferates. For an effect of the advertisement embedding technology, refer to FIG. 1. A left figure in FIG. 1 is an original video picture, and a right figure is a picture in which a print advertisement is embedded.

From a perspective of a technology evolution process, an embedded advertisement has also experienced a relatively primitive stage to a relatively intelligent stage of development. In an initial stage, an advertisement board and a poster are usually placed in a shooting scenario, and a shot is reserved. Subsequently, due to problems such as advertiser material selection, advertisement position selection, and abrupt market change, an originally existing advertisement needs to be replaced. Therefore, some methods for performing advertisement replacement based on a simple feature parameter after a placeholder is preset in a video or an advertisement position is manually identified are proposed. However, with development of technologies, some methods tend to automatically implement advertisement replacement. For example, after a video is shot and segmented, a candidate advertisement insertion position is simply determined based on preset attribute features such as a shape, a size, a color, and duration of an area in a video, and the advertisement position is stitched and rendered in a manner such as template matching. Actually, how to automatically detect a suitable print advertisement position in a video and seamlessly stitch a to-be-embedded advertisement material into a surrounding environment is still an extremely complex problem. Therefore, how to automatically detect a suitable print advertisement position in a video and seamlessly stitch a to-be-embedded advertisement material into a surrounding environment is a technical problem that needs to be resolved currently.

SUMMARY

Embodiments of the present disclosure provide a method for embedding an advertisement in a video and a computer device. The computer device may fully automatically pinpoint an advertisement position, embed an advertisement, and keep consistent style between the embedded advertisement and another pixel in an image, to improve visual experience of the embedded advertisement.

The embodiments of the present disclosure may be implemented using the following technical solutions.

According to a first aspect, an embodiment of the present disclosure provides a method for embedding an advertisement in a video, and the method is applied to a computer device. The method includes: determining, by a computer device, a target image, where the target image is an image that is in M frames of images of a target video and that includes a first print advertisement, and M is a positive integer; determining, by the computer device, a target area, where the target area is an area in which the first print advertisement is located in the target image; inserting, by the computer device, a to-be-embedded second print advertisement into the target area to replace the first print advertisement; and converting, by the computer device, a style of the target image in which the second print advertisement is embedded, where a style of the second print advertisement in the target image after style conversion is consistent with a style of an image pixel outside the area in which the second print advertisement is located in the target image. By implementing this embodiment of the present disclosure, the computer device may fully automatically pinpoint an advertisement position, embed an advertisement, and seamless stitching of an embedded advertisement and a surrounding environment without manual intervention, such that detection and positioning are more intelligent. In addition, the embedded advertisement is not only simply placed, and a print advertisement material is seamlessly stitched into a surrounding environment of the print advertisement material, which makes a print advertisement seem to be originally a part of a video, and improves visual experience of the video.

Optionally, the converting, by the computer device, a style of the target image in which the second print advertisement is embedded includes converting, by the computer device, the style of the second print advertisement in the target image into the style of the image pixel outside the second print advertisement in the target image.

The style includes but is not limited to a color and a tone of an image.

In a possible design, the first print advertisement is any print advertisement.

In a possible design, the determining, by a computer device, a target image includes: recognizing, by the computer device based on a first convolutional neural network model, whether an $i^{th}$ frame of image in the M frames of images includes the first print advertisement; and if the $i^{th}$ frame of image includes the first print advertisement, determining that the $i^{th}$ frame of image is the target image, where i is a positive integer ranging from 1 to M successively. By implementing this embodiment of the present disclosure, the computer device may automatically identify, based on a convolutional neural network algorithm without manual determining, whether an image includes a print advertisement. Therefore, this saves time and effort, and improves image recognition efficiency.

In a possible design, the recognizing, by the computer device based on a first convolutional neural network model, whether an $i^{th}$ frame of image in the M frames of images includes the first print advertisement includes: inputting, by the computer device, the $i^{th}$ frame of image in the M frames of images into at least one convolutional layer in the first convolutional neural network model, to obtain a feature map of a last convolutional layer in the at least one convolutional layer, where the first convolutional neural network model includes the at least one convolutional layer, at least one fully connected layer, and one Softmax layer; inputting, by the computer device, the feature map of the last convolutional layer into the at least one fully connected layer, to obtain a two-dimensional vector output by a last fully connected layer in the at least one fully connected layer; and inputting, by the computer device, the two-dimensional vector into the Softmax layer, to obtain a vector used to identify whether the $i^{th}$ frame of image includes the first print advertisement.

In a possible design, a weight parameter and a bias term parameter of a convolutional layer in the first convolutional neural network model, and a weight parameter and a bias term parameter of a fully connected layer in the first convolutional neural network model are trained and generated based on a preset image that includes the first print advertisement and a preset image that does not include the first print advertisement.

In a possible design, the determining, by the computer device, a target area includes: inputting, by the computer device, the target image into a second convolutional neural network model, to obtain a first vertex coordinate set of the first print advertisement in the target image; obtaining, by the computer device, a second vertex coordinate set based on the first vertex coordinate set, where a difference between the second vertex coordinate set and the first vertex coordinate set is less than or equal to a first preset threshold, and herein, a polygon formed by the second vertex coordinate set is located near a polygon formed by the first vertex coordinate set; performing, by the computer device, at least one deformation on an area including the second vertex coordinate set, to obtain N deformed areas, where N is a positive integer; and inputting, by the computer device, the N deformed areas into a preset third convolutional neural network model, to obtain the target area, where the third convolutional neural network model is used to recognize an area that is in the N deformed areas and that is most accurate to position the first print advertisement. By implementing this embodiment of the present disclosure, the computer device may automatically identify, based on a convolutional neural network algorithm without manual determining, an accurate area in which a print advertisement is located in an image. Therefore, this saves time and effort, and improves advertisement positioning efficiency and accuracy.

In a possible design, a weight parameter and a bias term parameter of a convolutional layer in the third convolutional neural network model, and a weight parameter and a bias term parameter of a fully connected layer in the third convolutional neural network model are trained and generated based on a preset area that is accurate in positioning and a preset area that is inaccurate in positioning.

In a possible design, after the performing at least one deformation on an area including the second vertex coordinate set, and before the inputting the N deformed areas into a preset third convolutional neural network model, to obtain the target area, the method further includes: filling a pure color in the N deformed areas.

Optionally, the third convolutional neural network model includes a convolutional layer, a pooling layer, a fully connected layer, and a Softmax layer.

Optionally, if there are a plurality of target areas, after the inputting the N deformed areas into a preset third convolutional neural network model, to obtain the target area, the method further includes selecting, from the plurality of target areas, an area that is most accurate to position the first print advertisement. By implementing this embodiment of the present disclosure, manual intervention may be performed, and after a plurality of candidate advertisement positions are obtained, an advertisement position that is most accurately positioned may be selected, to improve visual experience after a print advertisement is embedded.

In a possible design, the target image includes P frames. After the inserting, by the computer device, a to-be-embedded second print advertisement into the target area to replace the first print advertisement, and before the converting a style of the target image in which the second print advertisement is embedded, the method further includes: tracking, by the computer device using a corner point tracking algorithm, coordinates of the second print advertisement embedded in each of the P frames of target image; and if the P frames of target image include a first image in which the second print advertisement is embedded, and a coordinate offset value of the second print advertisement is greater than or equal to a second preset threshold, adjusting, by the computer device, the coordinates of the second print advertisement in the first image, such that the coordinate offset value of the second print advertisement in the first image is less than the second preset threshold. By implementing this embodiment of the present disclosure, after a print advertisement is embedded in a plurality of frames of images, an area of the print advertisement in a plurality of consecutive frames of images may be tracked, to ensure that coordinates of the embedded print advertisement remain consistent in the plurality of consecutive frames of images, thereby improving smoothness of the embedded print advertisement in a video playing process.

In a possible design, the corner point tracking algorithm includes a Kanade-Lucas-Tomasi (KLT) algorithm.

In a possible design, the converting, by the computer device, a style of the target image in which the second print advertisement is embedded includes: inputting, by the computer device, the target image in which the second print advertisement is embedded to a generative adversarial network model, to obtain an image after style conversion, where the style of the second print advertisement is consistent with a style of an image pixel outside the second print advertisement in the image after style conversion. By implementing this embodiment of the present disclosure, style conversion is performed on an image in which a print advertisement is embedded, such that styles such as a color and a tone of the print advertisement keep consistent with a style of image pixels surrounding the print advertisement, thereby ensuring that the print advertisement does not seem obtrusive in a video playing process and achieving a natural and smooth seamless stitching effect.

In a possible design, the generative adversarial network model includes a generator and a discriminator. The generator includes a convolutional layer, a pooling layer, a deconvolution layer, and an anti-pooling layer. The discriminator includes a convolutional layer, a pooling layer, a fully connected layer, and a Softmax layer.

In a possible design, a weight parameter and a bias term parameter of the convolutional layer in the generator, and a weight parameter and a bias term parameter of the deconvolution layer in the generator are trained and generated based on a preset image in which the second print advertisement has been embedded and an image that is obtained by adjusting a style of the image in which the second print advertisement has been embedded; and a weight parameter and a bias term parameter of the convolutional layer in the discriminator, and a weight parameter and a bias term parameter of the fully connected layer in the discriminator are trained and generated based on the preset image in which the second print advertisement has been embedded and the image that is obtained by adjusting the style of the image in which the second print advertisement has been embedded.

According to a second aspect, an embodiment of the present disclosure provides a computer device. The computer device may include a plurality of functional modules or units configured to correspondingly execute the method, provided in the first aspect, for embedding an advertisement in a video.

According to a third aspect, an embodiment of the present disclosure provides a computer device configured to execute the method for embedding an advertisement in a video in the first aspect. The computer device may include: a memory, and a processor, a communications interface, and the like that are coupled to the memory, where the communications interface is configured to communicate with another device. The memory is configured to store code for implementing the method for embedding an advertisement in a video in the first aspect, and the processor is configured to execute a program code stored in the memory, in other words, execute the method for embedding an advertisement in a video in the first aspect.

According to a fourth aspect, an embodiment of the present disclosure provides a computer storage medium configured to store a computer software instruction used by the foregoing computer device. The computer storage medium includes a program that is designed for the computer device in the first aspect.

According to a fifth aspect, an embodiment of the present disclosure provides a computer program product including an instruction. When the computer program product runs on a computer, the computer is enabled to execute the method for embedding an advertisement in a video in the first aspect.

By implementing the method embodiment in the present disclosure, an existing old print advertisement in a video may be fully automatically detected and positioned without manually presetting a particular placeholder or manually detecting and identifying advertisement position coordinates, or designing a simple print advertisement feature rule to implement automatic detection. Instead, a feature of a print advertisement is automatically generated using a convolutional neural network. Therefore, detection and positioning are more flexible and more intelligent, and positioning is more accurate. Moreover, during advertisement embedding, an advertisement is not only simply placed, and a print advertisement material is seamlessly stitched into image pixels around the print advertisement material based on a style migration method, which makes a print advertisement seem to be originally a part of a video, and improves visual experience of an embedded advertisement.

DESCRIPTION OF EMBODIMENTS

To facilitate understanding of embodiments of the present disclosure, a hardware device in the embodiments of the present disclosure is first described.

Figure 1:
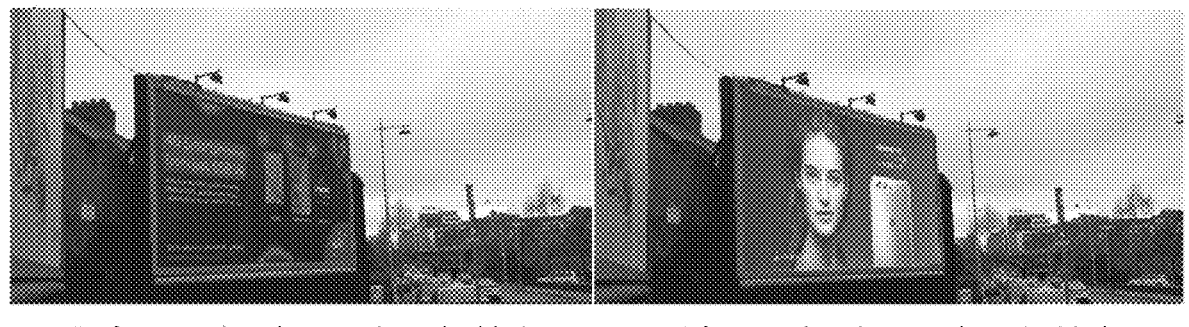
FIG. 1 is a schematic diagram of an embedded advertisement according to an embodiment of the present disclosure.
Figure 2:
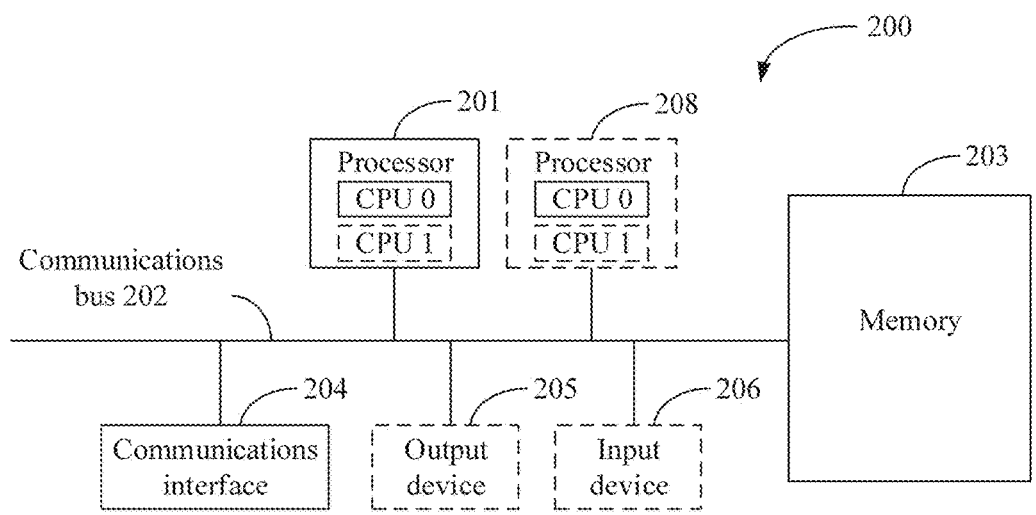
FIG. 2 is a schematic diagram of a structure of a computer device according to an embodiment of the present disclosure.

FIG. 2 is a schematic diagram of a computer device according to an embodiment of the present disclosure. A computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control execution of programs of the solution of this disclosure.

The communications bus 202 may include a channel for transmitting information between the foregoing components. The communications interface 204 uses any transceiver-like apparatus to communicate with another device or a communications network, such as an Ethernet, a radio access network (RAN), or a wireless local area network (WLAN).

The memory 203 may be a read-only memory (ROM) or another type of static storage device that can store static information and a static instruction, a random access memory (RAM) or another type of dynamic storage device that can store information and an instruction, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor using the bus. The memory may alternatively be integrated with the processor.

The memory 203 is configured to store program code used to execute the solution of the present disclosure, and the processor 201 controls execution of the program code. The processor 201 is configured to execute the program code stored in the memory 203.

During implementation, in an embodiment, the processor 201 may include one or more CPUs, for example, a CPU 0 and a CPU 1 in FIG. 2.

During implementation, in an embodiment, the computer device 200 may include a plurality of processors, for example, the processor 201 and a processor 208 in FIG. 2. Each of the processors may be a single-core (single-CPU) processor, or a multi-core (multi-CPU) processor. The processor herein may be one or more devices, circuits, and/or processing cores configured to process data (for example, a computer program instruction).

During implementation, in an embodiment, the computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, an audio output module, or the like. The input device 206 communicates with the processor 201, and may receive user input in a plurality of manners. For example, the input device 206 may be a mouse, a keyboard, a touchscreen device, a sensing device, or the like.

The computer device 200 may be a general-purpose computer device or a special-purpose computer device. During implementation, the computer device 200 may be a desktop computer, a portable computer, a network server, a wireless terminal device, a communications device, an embedded device, or a device having a structure similar to that in FIG. 2. A type of the computer device 200 is not limited in this embodiment of the present disclosure.

Figure 3:
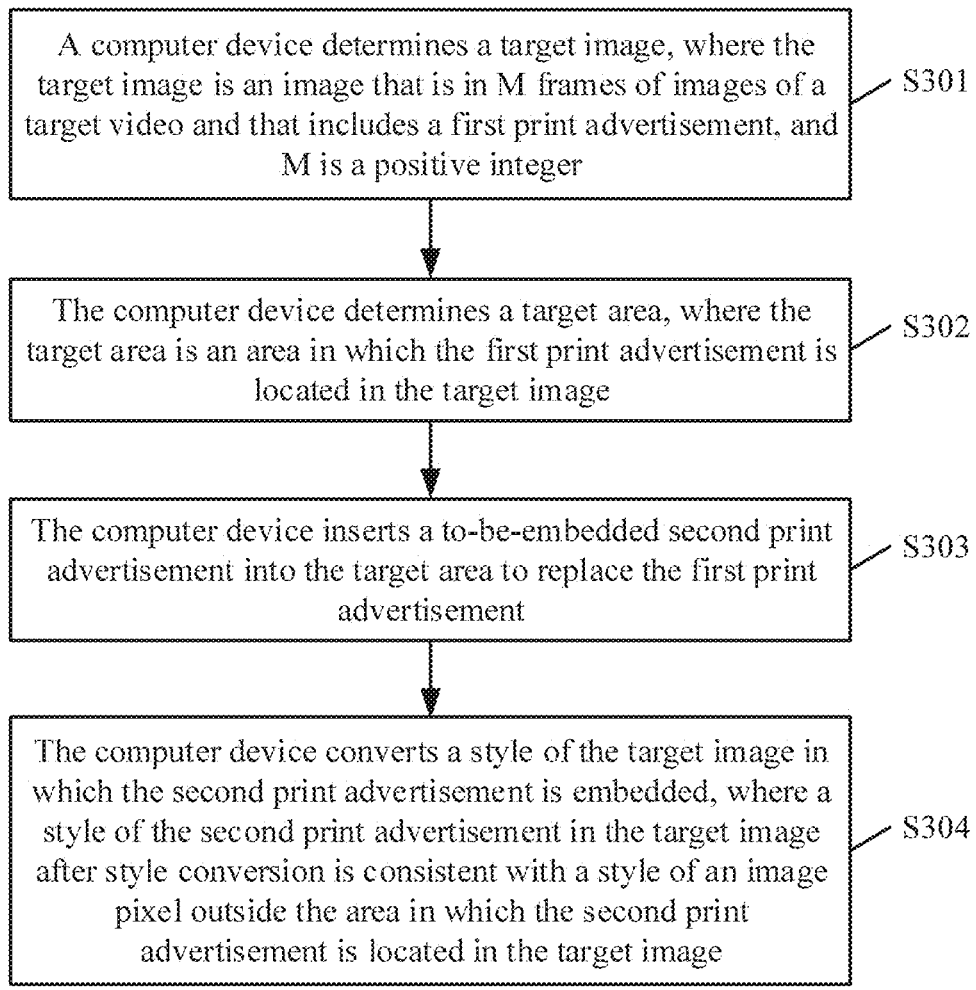
FIG. 3 is a schematic flowchart of a method for embedding a print advertisement in a video according to an embodiment of the present disclosure.

Based on the computer device shown in FIG. 2, a method for embedding an advertisement in a video according to an embodiment of the present disclosure is described with reference to FIG. 3. As shown in FIG. 3, the method for embedding an advertisement in a video includes but is not limited to the following steps.

S301. The computer device determines a target image, where the target image is an image that is in M frames of images of a target video and that includes a first print advertisement, and M is a positive integer.

In this embodiment of the present disclosure, the first print advertisement is any print advertisement. For ease of description, the first print advertisement may also be referred to as an old print advertisement, and a to-be-embedded second print advertisement may be referred to as a new print advertisement. The print advertisement herein is an advertisement in any quadrilateral shape, and a location and a size of an area may be determined using four coordinates: an upper left corner, an upper right corner, a lower left corner, and a lower right corner. Advertisement content is not specifically limited to a quadrilateral shape, and may be in any shape.

That the computer device determines a target image includes: The computer device recognizes, based on a first convolutional neural network model, whether an $i^{th}$ frame of image in the M frames of images includes the first print advertisement; and if the $i^{th}$ frame of image includes the first print advertisement, the computer device determines that the $i^{th}$ frame of image is the target image, where i is a positive integer ranging from 1 to M successively. That an image includes a print advertisement means that there is a print advertisement in the image.

In this embodiment of the present disclosure, the target video is a video file in which an advertisement needs to be embedded. The M frames of images may be several key frames in a plurality of frames of images included in the target video. For example, a video compression domain corresponding to the target video includes I frames, B frames, and P frames, and the M frames of images are the I frames. The M frames of images may alternatively be several frames of images selected from the target video at a specified interval. The M frames of images may alternatively be all frames included in the target video. This is not specifically limited in this embodiment of the present disclosure.

Figure 4:
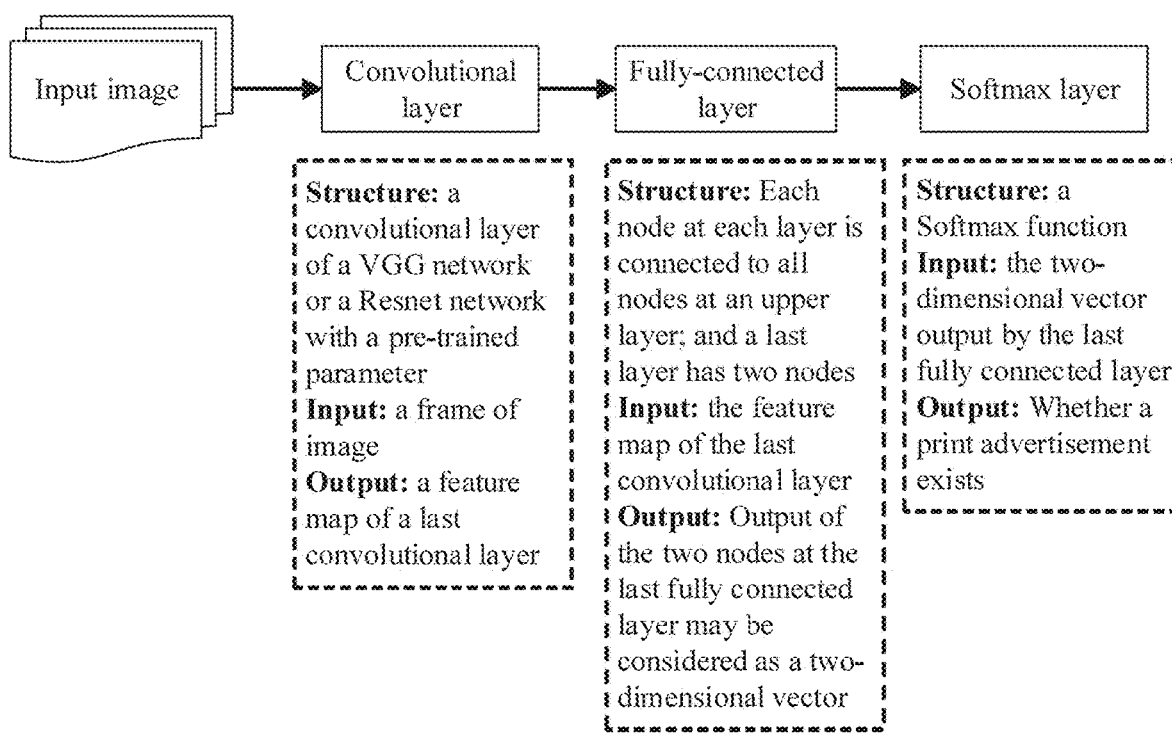
FIG. 4 is a schematic diagram of a structure of a first convolutional neural network model according to an embodiment of the present disclosure.

The following describes how to recognize/detect whether a frame of image includes advertisement content in this embodiment of the present disclosure. Herein, classification is used to implement to detect whether an image includes a print advertisement. A structure of a designed first convolutional neural network model is shown in FIG. 4. The first convolutional neural network model includes a convolutional layer, a fully connected layer, and a Softmax layer. There is at least one convolutional layer, and there is at least one fully connected layer.

The convolutional layer uses an idea of transfer learning, and a structure of the convolutional layer may be a convolutional layer part of a VGG network, a Resnet network, or another network that has a pre-trained network parameter. A convolutional layer of a VGG-16 network is used as an example: All network structures from a first convolutional layer (that includes 64 3×3 convolution kernels, and can generate 64 feature maps) to a last convolutional layer (that includes 512 1×1 convolution kernels, and can generate 512 feature maps) in the VGG-16 network are used as the convolutional layer in this step, and parameters that are of each convolutional layer and are trained on an Imagenet or some other Benchmark data sets are used as parameters in this step. An input of the convolutional layer is a single-frame video image, and an output is a feature map generated by the last convolution layer. Using the VGG-16 as an example, the output of the conventional layer is 512 feature maps.

The convolutional layer is followed by k fully connected layers (value of k is usually 2 to 3). Because classification is used to implement detection of an existing print advertisement, in this embodiment of the present disclosure, a quantity of nodes of a last fully connected layer is set to 2, and a quantity of nodes of the other fully connected layers is not limited. An input of a fully connected layer is all feature maps output by the last convolutional layer (using the VGG-16 as an example, an output of the fully connected layer is 512 feature maps), and the output of the fully connected layer is a two-dimensional vector.

The last layer of the first convolutional neural network model is the Softmax layer. This layer has no parameter, and is used to normalize a two-dimensional vector output by the last fully connected layer, and map a result to a range of [0, 1]. An output of the Softmax layer is a probability of whether there is a print advertisement. For example, assuming that an image that includes a print advertisement belongs to a first type, an image that does not include a print advertisement belongs to a second type, and an output value of the last fully connected layer is $[x_1, x_2]$, a calculation formula of the Softmax layer is:

$$x_i = x_i - \max(x_1, x_2)$$

$$p_i = e^{x_i} / \Sigma_{j=1}^2 e^{x_j}$$

A subscript i with a maximum $p_i$ value identifies whether an image belongs to the first type or the second type, in other words, whether the image includes a print advertisement or does not include a print advertisement.

After the first convolutional neural network model is constructed, a parameter of the fully connected layer in the model needs to be determined by training, and the parameter of the convolutional layer needs to be finely adjusted. A large quantity of images that include print advertisements and images that do not include print advertisements are collected to construct a training dataset. For example, assuming that a type of an image $x^i$ is marked as $y^i$, and there are a total of n images, the training dataset is represented as $\{(x^1, y^1), (x^2, y^2), \ldots, (x^n, y^n)\}$. A loss function of the first convolutional neural network model is constructed as follows using a mean square error (MSE):

$$J(W, b) = \frac{1}{n}\sum_{i=1}^{n}\left(\frac{1}{2}(f_{W,b}(x^i) - y^i)^2\right)$$

In the loss function, W represents a weight parameter of all layers (including all the convolutional layers and all the fully connected layers) in the first convolutional neural network model, b represents a bias term parameter of all the layers (namely, the convolutional layers and the fully connected layers) in the first convolutional neural network model, and $f_{W,b}(x^i)$ is an actual output value of the first convolutional neural network model. Then, optimized parameters W and b are obtained through training using a back-propagation (BP) algorithm-based mini-batch gradient descent method.

During actual use/detection, one frame of image in the video is input to the first convolutional neural network model with a trained parameter, a classification and prediction vector is output at the Softmax layer, and a type represented by a component with a maximum value in the vector is a type to which the image actually belongs. For example, assuming that an image that includes a print advertisement belongs to the first type and is represented as [1, 0], and an image that does not include a print advertisement belongs to the second type and is represented as [0, 1], if a to-be-detected image is output as [0.9, 0.1] after passing through the Softmax layer, the image belongs to the first type, in other words, the image includes a print advertisement.

S302. The computer device determines a target area, where the target area is an area in which the first print advertisement is located in the target image.

Figure 5:
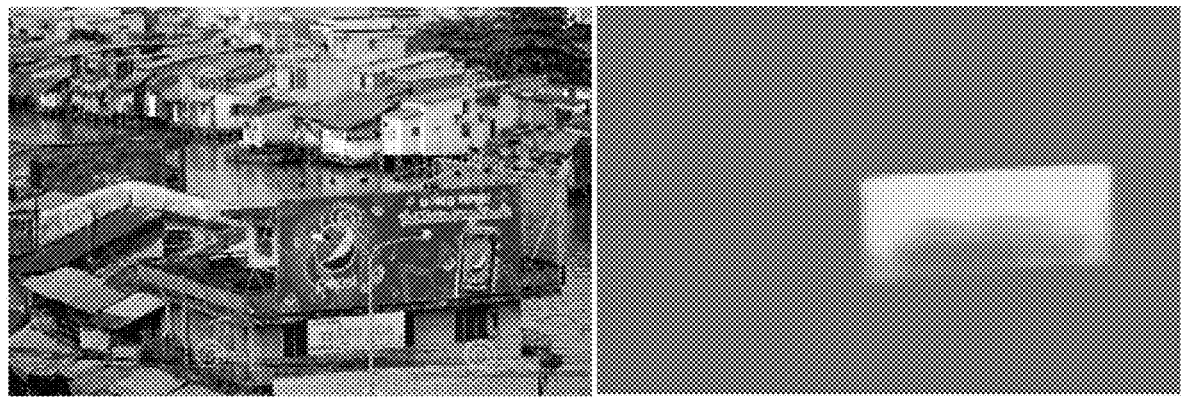
FIG. 5 is a schematic diagram of a manner of segmenting an image using a Unet to extract an area in which a print advertisement is located according to an embodiment of the present disclosure.

First, the target image that is determined in step S301 and already has the first print advertisement is input into a second convolutional neural network model, to roughly segment the print advertisement, in order to obtain an approximate area (which may be represented as coordinates, for example, the approximate area is a quadrilateral shape, and may be determined using coordinates of four vertexes in the quadrilateral shape, and the coordinates of the four vertexes form a first vertex coordinate set) of the print advertisement in the target image. Herein, the second convolutional neural network model may include but is not limited to a classic Unet or Deconvnet that is a convolutional neural network used for image segmentation. The Unet and the Deconvnet are classic methods for implementing image semantic segmentation using a convolutional neural network. Coordinates of the print advertisement obtained using the second convolutional neural network model are inaccurate, but basically indicate an approximate location of the print advertisement. For example, FIG. 5 shows a manner of performing image segmentation using the Unet to extract an area in which a print advertisement is located. After image segmentation is performed using the Unet, an area in which a print advertisement is located and that is shown in a right figure in FIG. 5 is extracted.

After the approximate area of the print advertisement is obtained, k bounding boxes may be generated, using a selective search method, near a print advertisement position obtained after rough segmentation, and are used to subsequently identify accurate coordinates of the print advertisement position. Herein, the generated k bounding boxes correspond to k groups of second vertex coordinate sets, and each second vertex coordinate set may be used to determine one bounding box. The selective search method is a classic method for generating a bounding box, and may cover a meaningful object in an image as much as possible. In this step, the meaningful object refers to the print advertisement. It should be noted that a manner of generating the bounding boxes is not limited to the selective search method.

Then, each of the k bounding boxes generated in the foregoing step is deformed into m different shapes, to match a real shape of the print advertisement. The deformation includes any operation such as changing a side length and an inner angle of a rectangle, to change the bounding box to any quadrilateral shape. It should be noted that, because the selective search method can only generate bounding boxes and a form of a real print advertisement in an image are changeable, proper deformation of the bounding boxes can ensure that a finally determined area is more accurately positioned in a real area in which the print advertisement is located. It should be noted that quantities of shapes that each of the k bounding boxes generated in the foregoing step is deformed into may be different. For example, the k bounding boxes include three bounding boxes, a first bounding box is deformed into three different shapes, a second bounding box is deformed into two different shapes, and a third bounding box is deformed into four different shapes. After the three bounding boxes are deformed, N=9 deformed areas are obtained, in other words, nine candidate advertisement positions are obtained. In this embodiment of the present disclosure, an example in which each bounding box is deformed into a same quantity of shapes is used for description.

Figure 6:
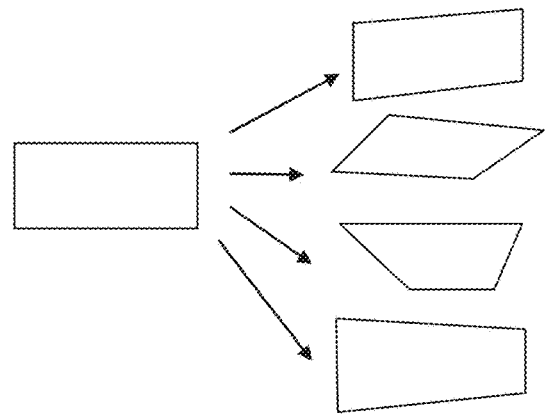
FIG. 6 is a schematic diagram of a manner of deforming a bounding box to obtain a candidate advertisement position according to an embodiment of the present disclosure.

An example in which a bounding box obtained using the selective search method in FIG. 5 is used for deformation is shown in FIG. 6. Each bounding box in a deformed image generates m deformed areas (which may be referred to as candidate advertisement positions), and coordinates (x1, y1), (x2, y2), (x3, y3), and (x4, y4) of four corners of the m candidate advertisement positions are separately recorded.

After k×m=N candidate advertisement positions are obtained, an area accurate in positioning needs to be selected from the candidate advertisement positions as an area of a to-be-embedded advertisement. In this embodiment of the present disclosure, classification is used to implement pixel-level accurate positioning of the print advertisement. An area formed by coordinates of four corners of m candidate advertisement positions generated by a bounding box is filled with a pure color, to generate m mask images. The m mask images are input to a newly designed third convolutional neural network model, and an output of the third convolutional neural network model is a mask image that in the m mask images and in which advertisement positioning is most accurate. A third convolutional neural network may be referred to as a FourCornerNet network.

A process of selecting a candidate advertisement position that is most accurately positioned may include the following steps 11 to 14.

Figure 7:
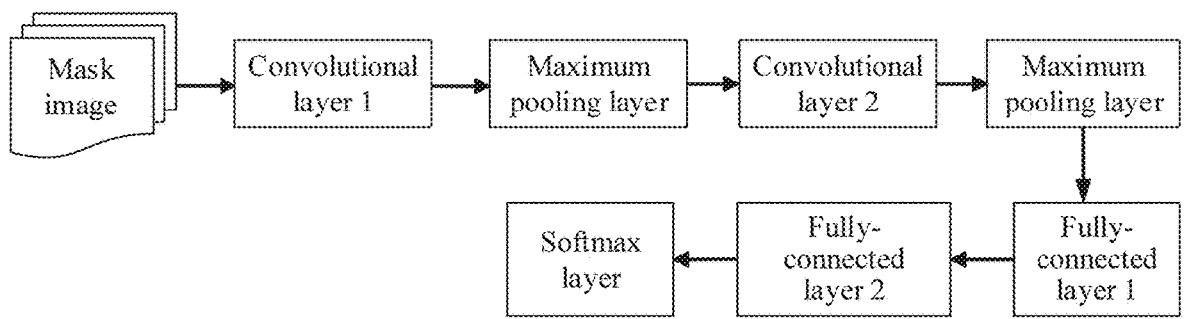
FIG. 7 is a schematic diagram of a structure of a third convolutional neural network model according to an embodiment of the present disclosure.

11. Construct a structure of the third convolutional neural network. The third convolutional neural network uses a simple shallow convolutional neural network design, includes multi-layer superposition of a convolutional layer and a pooling layer, then is connected to several fully connected layers, and finally is connected to a Softmax layer. FIG. 7 shows the structure of the third convolutional neural network. The third convolutional neural network includes two convolutional layers, two maximum pooling layers, two fully connected layers, and one Softmax layer. A quantity and sizes of convolution kernels in the convolutional layers, a downsampling scale of the maximum pooling layers, and a quantity of nodes in a fully connected layer 1 are not limited, and may be adjusted based on an experiment requirement. Because classification is used to implement accurate positioning of an advertisement position, to be more specific, determining whether a mask image is an image that has an accurate advertisement position, a fully connected layer 2 includes two nodes, and an output of the corresponding Softmax layer is a two-dimensional vector.

12. Construct a training sample set of the third convolutional neural network. After each image that already has the first print advertisement is processed in the foregoing step, each bounding box generates m mask images, only one of the m mask images is accurate in advertisement position positioning, and the rest are inaccurate in positioning. Therefore, the mask images may be simply divided into two types, namely, mask images accurate in positioning and mask images inaccurate in positioning. Assuming that bounding boxes of n images that already have a print advertisement are collected, there are m×n mask images, and each of the m×n mask images has an accurate advertisement position, or has an inaccurate advertisement position. The m×n mask images x and their corresponding types y form a training sample set: $\{(x^1, y^1), (x^2, y^2), \ldots, \text{and } (x^{mn}, y^{mn})\}$.

13. Construct a loss function of the third convolutional neural network, and calculate a network parameter of the third convolutional neural network t by training. The loss function of the third convolutional neural network model is constructed as follows using a mean square error (MSE):

$$J(W, b) = \frac{1}{mn}\sum_{i=1}^{mn}\left(\frac{1}{2}(f_{W,b}(x^i) - y^i)^2\right)$$

In the loss function, W represents a weight parameter of all layers (including all the convolutional layers and all the fully connected layers) in the third convolutional neural network, b represents a bias term parameter of all the layers (including all the convolutional layers and all the fully connected layers) in the third convolutional neural network, and $f_{W,b}(x^i)$ is an actual output value of the network. Then, optimized parameters W and b are obtained through training using a BP algorithm-based mini-batch gradient descent method.

14. Sequentially input m mask images generated in an actually to-be-predicted image that already has a print advertisement to the third convolutional neural network with a trained network parameter, and each mask image outputs a two-dimensional vector after passing through the Softmax layer, where a type represented by a component with a maximum value in the two-dimensional vector is a type to which the mask image actually belongs. Assuming that a mask image having an accurate advertisement position belongs to a first type and is represented as [1, 0], and a mask image having an inaccurate advertisement position belongs to a second type and is represented as [0, 1], if a to-be-predicted mask image is output as [0.8, 0.2] after passing through the Softmax layer, the mask image belongs to the first type, in other words, a candidate advertisement position in the mask image is accurately positioned.

Optionally, coordinates of a candidate advertisement position A that is accurately positioned at a pixel level and that is selected from the third convolutional neural network are finely adjusted. Because a real shape of a print advertisement is diversified, and the m deformations in the foregoing step may not completely cover all shapes, a conventional manner that is based on pixel value difference and an edge feature may be used to finely adjust coordinates of a real advertisement position. A feasible method is to perform edge detection on an image. Assuming that four coordinates of the candidate advertisement position A are $(x_1, y_1)$, $(x_2, y_2)$, $(x_3, y_3)$, and $(x_4, y_4)$, and a straight line connecting points $(x_1, y_1)$ and $(x_2, y_2)$ and a straight line obtained using an edge detection algorithm do not overlap, coordinates of the two points are modified, until the straight lines overlap, and so on. After fine adjustment, coordinates of a real candidate advertisement position that is finally accurately positioned at a pixel level are obtained.

It should be noted that after a deformed candidate advertisement position is obtained, pure color filling may not be performed. The pure color filling is intended to make an encircled area of a print advertisement more prominent, to facilitate image recognition.

Optionally, after the candidate advertisement position that is accurately positioned is obtained, manual intervention may further be performed, to be more specific, an optimal advertisement position is selected from a plurality of obtained accurate candidate advertisement positions. For example, the optimal advertisement position may be manually selected based on shapes, sizes, and relative positions of the candidate advertisement positions in the image. Alternatively, the optimal advertisement position may not be selected, but the plurality of accurate candidate advertisement positions are directly used as optimal advertisement positions.

S303. The computer device inserts a to-be-embedded second print advertisement into the target area to replace the first print advertisement.

After each frame of image in the video is processed in the steps S301 and S302, an optimal advertisement position has been extracted from an image that already has the first print advertisement, and a print advertisement usually appears in a plurality of consecutive frames in the video. Assuming that a total of P frames of consecutive images already include an old print advertisement after automatic detection in the step S301. Then optional advertisement positions in these consecutive images are extracted in the step S302. However, with movement of video pictures, coordinates of four corners of the optimal advertisement position in each frame of image may not be completely consistent. Subsequent processing steps include the following steps 21 and 22.

21. For each frame of the P frames of images that already include the old print advertisement after automatic detection, a manner of inserting a to-be-embedded new print advertisement into the optimal advertisement position in the frame of image may be as follows: It is assumed that coordinates of the optimal advertisement position in the frame of image in the image are an upper left corner $(x_1, y_1)$, an upper right corner $(x_2, y_2)$, a lower left corner $(x_3, y_3)$, and a lower right corner $(x_4, y_4)$. First, the to-be-embedded new print advertisement is moved in the image until coordinates of an upper left corner of the to-be-embedded new print advertisement coincide with $(x_1, y_1)$. A shape of the new print advertisement is not necessarily the same as the optimal advertisement position. Therefore, stretching, narrowing, and perspective transformation need to be used to adjust the shape of the new print advertisement to a shape of the optimal advertisement position, to be more specific, coordinates of the other three points of the new print advertisement are adjusted to $(x_2, y_2)$, $(x_3, y_3)$, and $(x_4, y_4)$, an area enclosed by the four points is the same as that of the optimal advertisement position, and positions of the four points are the same as those of the optimal advertisement position in the image.

22. Track the newly embedded print advertisement in the P frames of images using a corner point tracking algorithm, to ensure time-space coherence of the print advertisement: use coordinates of four corners of the newly embedded print advertisement in each frame of image as feature points, and track the coordinates of the four corners frame by frame using the corner point tracking algorithm, where if a feature point offset at a location of the newly embedded print advertisement in a frame of image in consecutive several frames of images exceeds a threshold, it indicates that coordinates of an optimal advertisement position of this frame of image are inconsistent with those of an optimal advertisement position of an adjacent frame of image, and need to be adjusted to the coordinates of the optimal advertisement position of the adjacent frame of image. The corner point tracking algorithm includes but is not limited to: a Kanade-Lucas-Tomasi (KLT) algorithm, where the KLT algorithm herein is a classic corner point tracking algorithm, and object tracking is implemented by selecting feature points in a plurality of frames of images for matching. An example is as follows.

Figure 8:
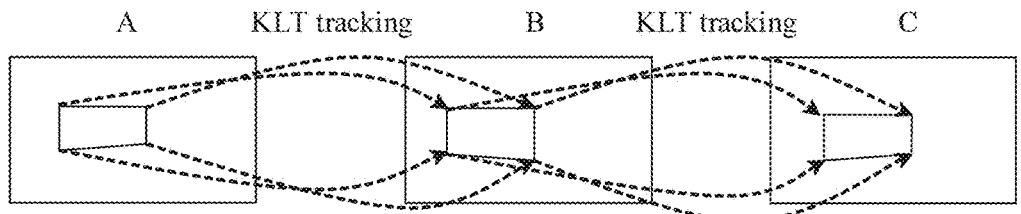
FIG. 8 is a schematic diagram of a manner of corner point tracking coordinates of a print advertisement according to an embodiment of the present disclosure.

Assuming that several consecutive frames of images are respectively A, B, and C, and coordinates of four corners of a newly embedded print advertisement position in A are: an upper left corner $(Ax_1, Ay_1)$, an upper right corner $(Ax_2, Ay_2)$, a lower left corner $(Ax_3, Ay_3)$, and a lower right corner $(Ax_4, Ay_4)$. By analogy, coordinates of four corners of the rest two images are respectively: an upper left corner $(Bx_1, By_1)$, an upper right corner $(Bx_2, By_2)$, a lower left corner $(Bx_3, By_3)$, and a lower right corner $(Bx_4, By_4)$, and an upper left corner $(Cx_1, Cy_1)$, an upper right corner $(Cx_2, Cy_2)$, a lower left corner $(Cx_3, Cy_3)$, and a lower right corner $(Cx_4, Cy_4)$. The four corners are tracked frame by frame using the KLT algorithm. In an example of the upper left corner, a tracking path is from $(Ax_1, Ay_1)$ to $(Bx_1, By_1)$ to $(Cx_1, Cy_1)$. A coordinate offset of the upper left corner is calculated, and if the coordinate offset is less than a preset threshold, the coordinates are not adjusted; and if the coordinate offset is greater than a threshold, the coordinates are adjusted. For example, in FIG. 8, a tracking path for the coordinates of the lower right corner of the advertisement position is from $(Ax_4, Ay_4)$ to $(Bx_4, By_4)$ to $(Cx_4, Cy_4)$, where the coordinates of the lower right corner of the image B are different from those of A and C. If the coordinates are greater than a threshold, the coordinates are adjusted to an average value of the coordinates of the lower right corners of A and C, to keep time-space coherence.

S304. The computer device converts a style of the target image in which the second print advertisement is embedded, where a style of the second print advertisement in the target image after style conversion is consistent with a style of an image pixel outside the area in which the second print advertisement is located in the target image.

In this embodiment of the present disclosure, during style conversion, the style of the embedded second print advertisement may be converted into a style of image pixels around the second print advertisement in the target image. The image pixels around the second print advertisement are image pixels in a specified range centered on the area in which the second print advertisement is located. Alternatively, during style conversion, the style of the embedded second print advertisement may be converted into a style of all image pixels outside the second print advertisement in the target image.

Although the new print advertisement (namely, the second print advertisement) has been embedded in a plurality of frames of images of the video after the processing in the steps S301 to S303 processing, the style such as a color and a tone of the print advertisement needs to keep consistent with a style of a surrounding environment of the print advertisement. In this way, it can be ensured that the print advertisement does not seem obtrusive, and a natural and smooth seamless stitching effect is achieved. In this step, the style conversion is implemented using a generative adversarial network-based style migration algorithm. For example, the process includes the following steps 31 and 32.

31. Construct a training sample set. Select n images $x_1, x_2, \ldots,$ and $x_n$ in which the new print advertisement is embedded and that are obtained after the processing in the steps S301 to S303, and adjust styles of the images $x_1, x_2, \ldots,$ and $x_n$ using software such as Photoshop, to enable the print advertisement in the images to be smoothly and seamlessly stitched into the surrounding environment in terms of a visual effect, to obtain images $y_1, y_2, \ldots,$ and $y_n$ as ground truths. In this way, a training sample set $\{(x_1, y_1), \{(x_2, y_2), \ldots,$ and $\{(x_n, y_n)\}$ is formed.

Figure 9:
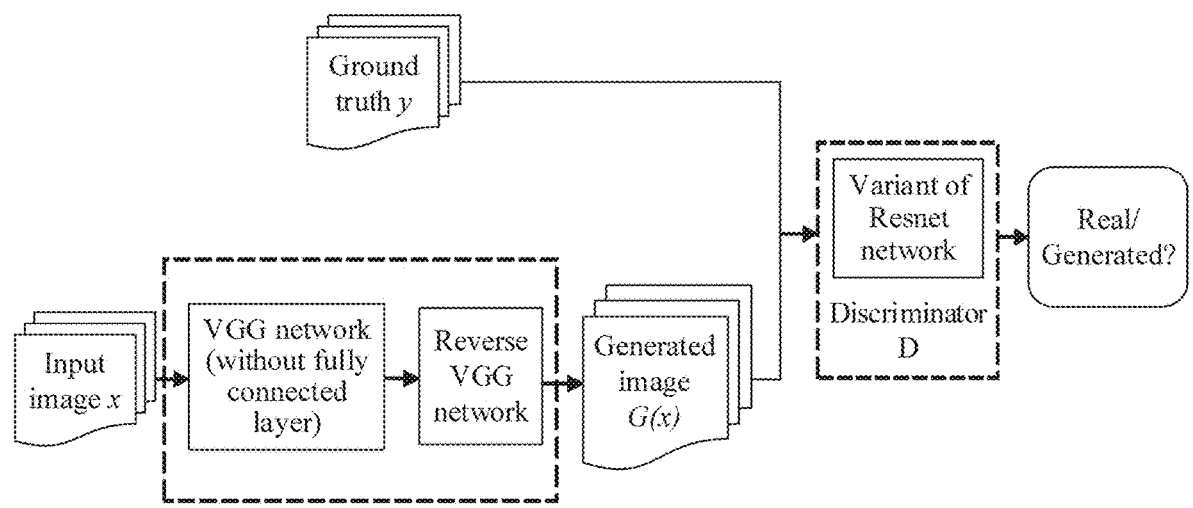
FIG. 9 is a schematic diagram of a structure of a generative adversarial network according to an embodiment of the present disclosure.

32. Construct a structure of a generative adversarial network (GAN), as shown in FIG. 9. A generative adversarial network model includes a generator and a discriminator.

In the present disclosure, a function of the generator G is to automatically render an input image x, to generate an image G(x). The G(x) needs to be as similar as possible to a ground truth y corresponding to the x, to achieve an effect of mixing the false with the genuine. A function of the discriminator D is to distinguish between the ground truth y and the generated image G(x) as correctly as possible.

Figure 10:
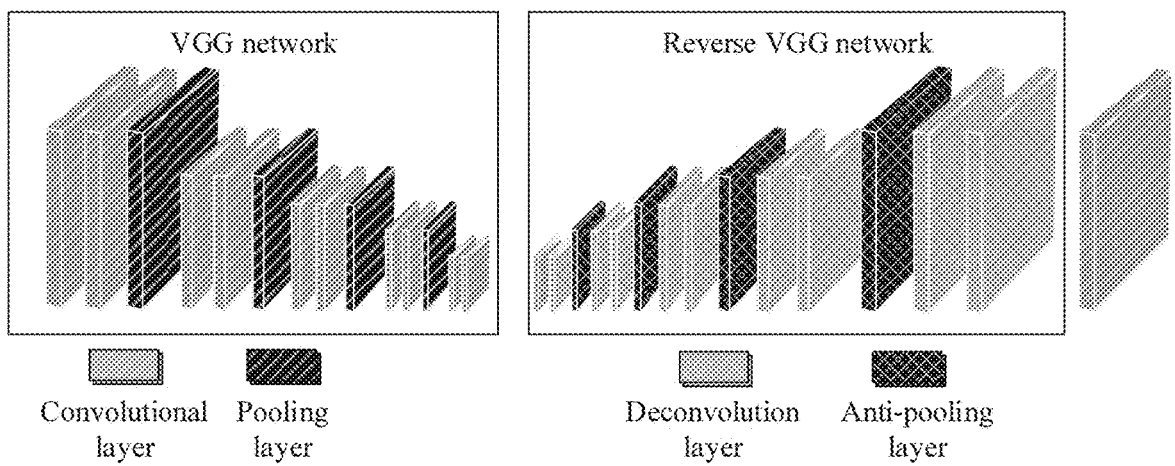
FIG. 10 is a schematic diagram of a network structure of a generator G according to an embodiment of the present disclosure.

A network structure of the generator G uses a classic VGG network in which a last pooling layer and all fully connected layers are removed, and a reverse VGG network is added. The reverse VGG network means that each layer of the network is in a one-to-one correspondence with the VGG network, and all operations are reverse operations. FIG. 10 shows the network structure of the generator G. In the VGG network, a first convolutional layer and a second convolutional layer each include 64 3×3 convolution kernels; a third layer is a maximum pooling layer; a fourth convolutional layer and a fifth convolutional layer each include 128 3×3 convolution kernels; a sixth layer is a maximum pooling layer; a seventh convolutional layer and an eighth convolutional layer each include 256 3×3 convolution kernels; a ninth layer is also a maximum pooling layer; a tenth convolutional layer and an eleventh convolutional layer each include 512 3×3 convolution kernels; a twelfth layer is a maximum pooling layer; and a thirteenth convolutional layer and a fourteenth convolutional layer each include 512 3×3 convolution kernels. The structure of the reverse VGG network is just opposite to that of the VGG network. In the reverse VGG network, a first deconvolution layer and a second deconvolution layer each include 64 3×3 convolution kernels; a third layer is a maximum anti-pooling layer; a fourth deconvolution layer and a fifth deconvolution layer each include 128 3×3 convolution kernels; a sixth layer is a maximum anti-pooling layer; a seventh deconvolution layer and an eighth deconvolution layer each include 256 3×3 convolution kernels; a ninth layer is also a maximum anti-pooling layer; a tenth deconvolution layer and an eleventh deconvolution layer each include 512 3×3 convolution kernels; a twelfth layer is a maximum anti-pooling layer; a thirteenth deconvolution layer and a fourteenth deconvolution layer each include 512 3×3 convolution kernels; and the fourteenth deconvolution layer is connected to a convolutional layer that includes three 3×3 convolution kernels, and an output of the convolutional layer is the generated image G(x).

Figure 11:
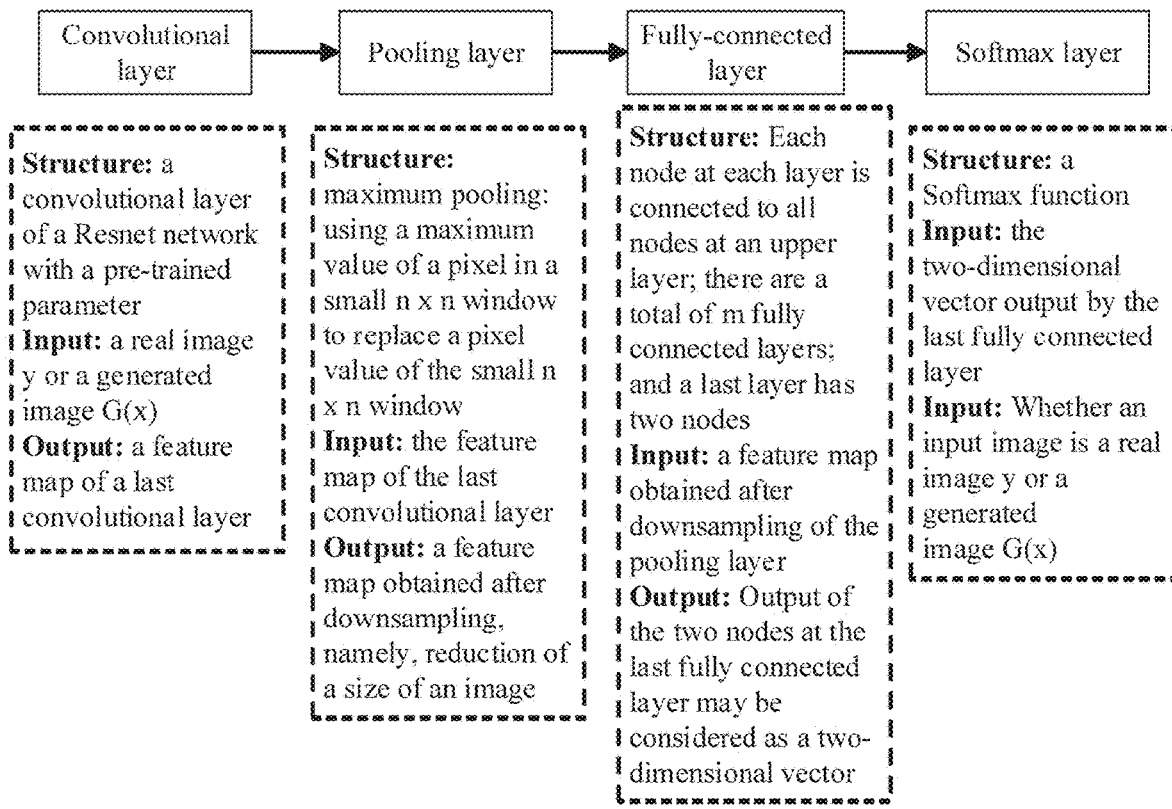
FIG. 11 is a schematic diagram of a network structure of a discriminator D according to an embodiment of the present disclosure.

The discriminator D uses a variant of a classic Resnet network structure: All network structures between a first convolutional layer and a last convolutional layer in the Resnet network are retained, and then the discriminator is connected to a maximum pooling layer, and then connected to m fully connected layers. The function of the discriminator D is to distinguish between a real image y and the generated image G(x), and may be considered as a classification of the two types. Therefore, the last fully connected layer includes two nodes. Finally, the discriminator is connected to a Softmax layer, to output a determining result (a real image or a generated image). FIG. 11 shows the network structure of the discriminator D.

A novel loss function for the generative adversarial network (GAN) needs to be constructed, and network parameters of the discriminator D and the generator G are separately trained.

A loss function of the discriminator D is constructed as follows: Assuming that the real image y is determined to be correct after being input into the discriminator D, and an output is 1, and assuming that the generated image G(x) is determined to be correct after being input into the discriminator D, and an output is −1, the loss function $L_D$ of the discriminator D is:

$$L_D = \sum_{i=1}^{n} (\|D_{W_D,b_D}(G(x_i)) + 1\|_2^2 + \|D_{W_D,b_D}(y_i) - 1\|_2^2)$$

In the loss function, n indicates that there are n input images (real images or generated images), $W_D$ indicates a weight parameter of all layers (including all convolutional layers and all fully connected layers in the discriminator D) in the discriminator D, $b_D$ represents a bias term parameter of all the layers (including all the convolutional layers and all the fully connected layers in the discriminator D) in the discriminator D, $D_{W_D,b_D}(G(x))$ represents an actual output value obtained through calculation after the generated image G(x) is input into the discriminator D, $D_{W_D,b_D}(y)$ indicates an actual output value obtained through calculation after the real image y is input to the discriminator D, and $\|\cdot\|_2^2$ is an L2 norm.

Then, finally trained parameters $W_D$ and $b_D$ of the discriminator D are obtained through training using the BP algorithm-based mini-batch gradient descent method.

A loss function of the generator G is constructed as follows:

$$L_G = \sum_{i=1}^{n} (\|D_{W_G,b_G}(x_i) - y_i\|_1^1 + \|D_{W_D,b_D}(G(x_i)) - 1\|_2^2)$$

In the loss function, n indicates that there are n input images, namely, the images $x_1, x_2, \ldots,$ and $x_n$ in which the new print advertisement is embedded and that are obtained after the processing in the steps S301 to S303 and are described in the step 5a; $W_G$ represents a weight parameter of all layers (including all the convolutional layers and all the deconvolution layers in the generator G) in the generator G, $b_G$ represents a bias term parameter of all the layers (including all the convolutional layers and all the deconvolution layers in the generator G) in the generator G, $G_{W_G,b_G}(x_i)$ represents an actually generated image obtained after the input image x is processed by the generator G; and as described in step 5a, $y_i$ represents a ground truth corresponding to an image $x_i$. $\|\cdot\|_1^1$ is an L1 norm, and is an absolute value of a difference between pixels at each same location in the images $x_i$ and $y_i$.

Then, finally trained parameters $W_G$ and $b_G$ of the generator G are obtained through training by also using the BP algorithm-based mini-batch gradient descent method.

In actual training, an alternate optimization method may be used: The generator G is first fixed, and the parameters of the discriminator D are trained, such that determining accuracy of the D is maximized; and then, the discriminator D is fixed, and the parameters of the generator G are trained, such that the determining accuracy of the D is minimized. In a same round of parameter update, the parameters of the discriminator D are usually updated for k times, and then the parameters of the G are updated once.

In actual use, only the generator G with trained parameters may need to be used: Each frame of image x in which the new print advertisement is embedded in the video is sequentially input into the generator G with trained parameters, and after operations at the convolutional layers, the pooling layers, the deconvolution layers, and the anti-pooling layers in the G, the generator G outputs a generated image G(x); and, in this case, the G(x) already achieves a degree of mixing the false with the genuine, and the newly embedded print advertisement is seamlessly stitched into the surrounding environment thereof.

By implementing the method embodiment in the present disclosure, an existing old print advertisement in a video may be fully automatically detected and positioned without manually presetting a particular placeholder or manually detecting and identifying advertisement position coordinates, and designing a simple print advertisement feature rule to implement automatic detection. Instead, a feature of a print advertisement is automatically generated using a convolutional neural network. Therefore, detection and positioning are more flexible and more intelligent, and positioning is more accurate. Moreover, during advertisement embedding, an advertisement is not only simply placed, and a print advertisement material is seamlessly stitched into a surrounding environment thereof based on a style migration method, which makes a print advertisement seem to be originally a part of a video, and improves visual experience of an embedded advertisement.

Figure 12:
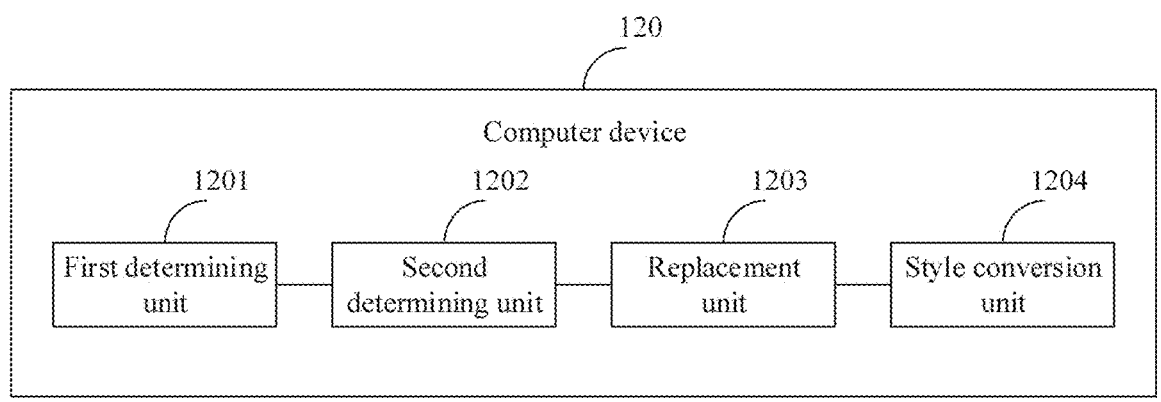
FIG. 12 is a structural block diagram of a computer device according to an embodiment of the present disclosure.

FIG. 12 is a structural block diagram of a computer device according to an embodiment of the present disclosure. As shown in FIG. 12, a computer device 120 may include: a first determining unit 1201, a second determining unit 1202, a replacement unit 1203, and a style conversion unit 1204.

The first determining unit 1201 is configured to determine a target image, where the target image is an image that is in M frames of images of a target video and that includes a first print advertisement, and M is a positive integer.

The second determining unit 1202 is configured to determine a target area, where the target area is an area in which the first print advertisement is located in the target image.

The replacement unit 1203 is configured to insert a to-be-embedded second print advertisement into the target area to replace the first print advertisement.

The style conversion unit 1204 is configured to convert a style of the target image in which the second print advertisement is embedded, where a style of the second print advertisement in the target image after style conversion is consistent with a style of an image pixel outside the area in which the second print advertisement is located in the target image.

Optionally, the first determining unit 1201 is configured to: recognize, based on a first convolutional neural network model, whether an $i^{th}$ frame of image in the M frames of images includes the first print advertisement; and if the $i^{th}$ frame of image includes the first print advertisement, determine that the $i^{th}$ frame of image is the target image, where i is a positive integer ranging from 1 to M successively.

Optionally, the first determining unit 1201 includes: a first calculation unit configured to input the $i^{th}$ frame of image in the M frames of images into at least one convolutional layer in the first convolutional neural network model, to obtain a feature map of a last convolutional layer in the at least one convolutional layer, where the first convolutional neural network model includes the at least one convolutional layer, at least one fully connected layer, and one Softmax layer; a second calculation unit configured to input the feature map of the last convolutional layer into the at least one fully connected layer, to obtain a two-dimensional vector output by a last fully connected layer in the at least one fully connected layer; and a third calculation unit configured to input the two-dimensional vector into the Softmax layer, to obtain a vector used to identify whether the $i^{th}$ frame of image includes the first print advertisement.

Optionally, a weight parameter and a bias term parameter of a convolutional layer in the first convolutional neural network model, and a weight parameter and a bias term parameter of a fully connected layer in the first convolutional neural network model are trained and generated based on a preset image that includes the first print advertisement and a preset image that does not include the first print advertisement.

Optionally, the second determining unit 1202 includes: a fourth calculation unit configured to input the target image into a second convolutional neural network model, to obtain a first vertex coordinate set of the first print advertisement in the target image; a fifth calculation unit configured to obtain a second vertex coordinate set based on the first vertex coordinate set, where a difference between the second vertex coordinate set and the first vertex coordinate set is less than or equal to a first preset threshold; a sixth calculation unit configured to perform at least one deformation on an area including the second vertex coordinate set, to obtain N deformed areas, where N is a positive integer; and a seventh calculation unit configured to input the N deformed areas into a preset third convolutional neural network model, to obtain the target area, where the third convolutional neural network model is used to recognize an area that is in the N deformed areas and that is most accurate to position the first print advertisement.

Optionally, a weight parameter and a bias term parameter of a convolutional layer in the third convolutional neural network model, and a weight parameter and a bias term parameter of a fully connected layer in the third convolutional neural network model are trained and generated based on a preset area that is accurate in positioning and a preset area that is inaccurate in positioning.

Optionally, the target image includes P frames. The computer device 120 further includes: a corner point tracking unit configured such that after the replacement unit 1203 inserts the to-be-embedded second print advertisement into the target area to replace the first print advertisement, and before the style conversion unit 1204 converts the style of the target image in which the second print advertisement is embedded, the corner point tracking unit tracks, using a corner point tracking algorithm, coordinates of the second print advertisement embedded in each of the P frames of target image; and an adjustment unit configured such that if the P frames of target image include a first image in which the second print advertisement is embedded, and a coordinate offset value of the second print advertisement is greater than or equal to a second preset threshold, the adjustment unit adjusts the coordinates of the second print advertisement in the first image, such that the coordinate offset value of the second print advertisement in the first image is less than the second preset threshold.

Optionally, the style conversion unit 1204 is configured to input the target image in which the second print advertisement is embedded to a generative adversarial network model, to obtain an image after style conversion, where the style of the second print advertisement is consistent with a style of an image pixel outside the second print advertisement in the image after style conversion.

Optionally, the generative adversarial network model includes a generator and a discriminator. The generator includes a convolutional layer, a pooling layer, a deconvolution layer, and an anti-pooling layer. The discriminator includes a convolutional layer, a pooling layer, a fully connected layer, and a Softmax layer.

Optionally, a weight parameter and a bias term parameter of the convolutional layer in the generator, and a weight parameter and a bias term parameter of the deconvolution layer in the generator are trained and generated based on a preset image in which the second print advertisement has been embedded and an image that is obtained by adjusting a style of the image in which the second print advertisement has been embedded; and a weight parameter and a bias term parameter of the convolutional layer in the discriminator, and a weight parameter and a bias term parameter of the fully connected layer in the discriminator are trained and generated based on the preset image in which the second print advertisement has been embedded and the image that is obtained by adjusting the style of the image in which the second print advertisement has been embedded.

It should be noted that, for implementations of the functional units included in the computer device 120, refer to the foregoing embodiments, and details are not described herein again. For content not mentioned in the embodiment of FIG. 12 and the implementations of the functional units, refer to the embodiment of FIG. 3, and details are not described herein again.

In conclusion, by implementing the embodiments in the present disclosure, an existing old print advertisement in a video may be fully automatically detected and positioned without manually presetting a particular placeholder or manually detecting and identifying advertisement position coordinates, and designing a simple print advertisement feature rule to implement automatic detection. Instead, a feature of a print advertisement is automatically generated using a convolutional neural network. Therefore, detection and positioning are more flexible and more intelligent, and positioning is more accurate. Moreover, during advertisement embedding, an advertisement is not only simply placed, and a print advertisement material is seamlessly stitched into image pixels around the print advertisement material based on a style migration method, which makes a print advertisement seem to be originally a part of a video, and improves visual experience of an embedded advertisement.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, such that the instructions executed by a computer or the processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for embedding an advertisement in a video, implemented by a computer device, and comprising:
    determining a target image comprising P frames, wherein the target image is an image that is in M frames of images of a target video and that comprises a first print advertisement, and wherein M is a positive integer;
    determining a target area in which the first print advertisement is located in the target image;
    embedding a second print advertisement into the target area to replace the first print advertisement;
    tracking, using a corner point tracking algorithm and after embedding the second print advertisement, coordinates of the second print advertisement embedded in each of the P frames;
    adjusting, after embedding the second print advertisement, when the P frames comprise a first image in which the second print advertisement is embedded, and when a coordinate offset value of the second print advertisement is greater than or equal to a second preset threshold, the coordinates of the second print advertisement in the first image such that the coordinate offset value of the second print advertisement in the first image is less than the second preset threshold; and
    converting, after tracking the coordinates and adjusting the coordinates, a style of the target image in which the second print advertisement is embedded,
    wherein a style of the second print advertisement after style conversion is consistent with a style of an image pixel outside an area in which the second print advertisement is located in the target image.

2. The method according to claim 1, wherein determining the target image comprises:
    recognizing, based on a first convolutional neural network model, whether an $i^{th}$ frame in the M frames comprises the first print advertisement; and
    determining, when the $i^{th}$ frame comprises the first print advertisement, that the $i^{th}$ frame is the target image, wherein i is a positive integer ranging from 1 to M successively.

3. The method according to claim 2, wherein recognizing whether the $i^{th}$ frame comprises the first print advertisement comprises:
    inputting the $i^{th}$ frame into at least one convolutional layer in the first convolutional neural network model to obtain a feature map of a last convolutional layer in the at least one convolutional layer, wherein the first convolutional neural network model comprises the at least one convolutional layer, at least one fully connected layer, and one Softmax layer;
    inputting the feature map into the at least one fully connected layer to obtain a two-dimensional vector output by a last fully connected layer in the at least one fully connected layer; and
    inputting the two-dimensional vector into the Softmax layer to obtain a vector for identifying whether the $i^{th}$ frame comprises the first print advertisement.

4. The method according to claim 3, wherein a weight parameter and a bias term parameter of a convolutional layer in the first convolutional neural network model and a weight parameter and a bias term parameter of a fully connected layer in the first convolutional neural network model are based on a preset image that comprises the first print advertisement and a preset image that does not comprise the first print advertisement.

5. The method according to claim 1, wherein determining the target area comprises:

inputting the target image into a second convolutional neural network model to obtain a first vertex coordinate set of the first print advertisement in the target image;

obtaining a second vertex coordinate set based on the first vertex coordinate set, wherein a difference between the second vertex coordinate set and the first vertex coordinate set is less than or equal to a first preset threshold;

performing at least one deformation on an area comprising the second vertex coordinate set to obtain N deformed areas, wherein N is a positive integer; and inputting the N deformed areas into a third convolutional neural network model to obtain the target area, wherein the third convolutional neural network model recognizes an area that is in the N deformed areas and that is most accurate to position the first print advertisement.

6. The method according to claim 5, wherein a weight parameter and a bias term parameter of a convolutional layer in the third convolutional neural network model and a weight parameter and a bias term parameter of a fully connected layer in the third convolutional neural network model are based on a preset area that is accurate in positioning and a preset area that is inaccurate in positioning.

7. The method according to claim 1, wherein converting the style of the target image comprises inputting the target image in which the second print advertisement is embedded to a generative adversarial network model to obtain an image after style conversion, and wherein the style of the second print advertisement is consistent with a style of an image pixel outside the second print advertisement in the image after style conversion.

8. The method according to claim 7, wherein the generative adversarial network model comprises a generator and a discriminator, wherein the generator comprises a convolutional layer, a pooling layer, a deconvolution layer, and an anti-pooling layer, and wherein the discriminator comprises a convolutional layer, a pooling layer, a fully connected layer, and a Softmax layer.

9. The method according to claim 8, wherein a weight parameter and a bias term parameter of the convolutional layer in the generator and a weight parameter and a bias term parameter of the deconvolution layer in the generator are trained and generated based on a preset image in which the second print advertisement has been embedded and an image that is obtained by adjusting a style of the image in which the second print advertisement has been embedded, and wherein a weight parameter and a bias term parameter of the convolutional layer in the discriminator and a weight parameter and a bias term parameter of the fully connected layer in the discriminator are trained and generated based on the preset image in which the second print advertisement has been embedded and the image that is obtained by adjusting the style of the image in which the second print advertisement has been embedded.

10. A computer device comprising:
a memory configured to store instructions; and
a processor coupled to the memory and configured to execute the instructions to cause the computer device to:
determine a target image comprising P frames, wherein the target image is an image that is in M frames of images of a target video and that comprises a first print advertisement, and wherein M is a positive integer;
determine a target area in which the first print advertisement is located in the target image;
embed a second print advertisement into the target area to replace the first print advertisement;
track, using a corner point tracking algorithm and after embedding the second print advertisement, coordinates of the second print advertisement embedded in each of the P frames;
adjust, after embedding the second print advertisement, when the P frames comprise a first image in which the second print advertisement is embedded, and when a coordinate offset value of the second print advertisement is greater than or equal to a second preset threshold, the coordinates of the second print advertisement in the first image such that the coordinate offset value of the second print advertisement in the first image is less than the second preset threshold; and
convert, after tracking the coordinates and adjusting the coordinates, a style of the target image in which the second print advertisement is embedded,
wherein a style of the second print advertisement after style conversion is consistent with a style of an image pixel outside an area in which the second print advertisement is located in the target image.

11. The computer device according to claim 10, wherein the computer device is an identity recognition apparatus, and wherein the processor is further configured to execute the instructions to cause the identity recognition apparatus to:
recognize, based on a first convolutional neural network model, whether an $i^{th}$ frame of image in the M frames of images comprises the first print advertisement; and
determine, when the $i^{th}$ frame comprises the first print advertisement, that the $i^{th}$ frame is the target image, wherein i is a positive integer ranging from 1 to M successively.

12. The computer device according to claim 11, wherein the processor is further configured to execute the instructions to cause the identity recognition apparatus to:
input the $i^{th}$ frame in the M frames into at least one convolutional layer in the first convolutional neural network model to obtain a feature map of a last convolutional layer in the at least one convolutional layer, wherein the first convolutional neural network model comprises the at least one convolutional layer, at least one fully connected layer, and one Softmax layer;
input the feature map of the last convolutional layer into the at least one fully connected layer to obtain a two-dimensional vector output by a last fully connected layer in the at least one fully connected layer; and
input the two-dimensional vector into the Softmax layer to obtain a vector for identifying whether the $i^{th}$ frame comprises the first print advertisement.

13. The computer device according to claim 12, wherein a weight parameter and a bias term parameter of a convolutional layer in the first convolutional neural network model and a weight parameter and a bias term parameter of a fully connected layer in the first convolutional neural network model are trained and generated based on a preset image that comprises the first print advertisement and a preset image that does not comprise the first print advertisement.

14. The computer device according to claim 10, wherein the computer device is an identity recognition apparatus, and wherein the processor is further configured to execute the instructions to cause the identity recognition apparatus to:
input the target image into a second convolutional neural network model to obtain a first vertex coordinate set of the first print advertisement in the target image;

obtain a second vertex coordinate set based on the first vertex coordinate set, wherein a difference between the second vertex coordinate set and the first vertex coordinate set is less than or equal to a first preset threshold;

perform at least one deformation on an area comprising the second vertex coordinate set to obtain N deformed areas, wherein N is a positive integer; and input the N deformed areas into a third convolutional neural network model to obtain the target area, wherein the third convolutional neural network model is for recognizing an area that is in the N deformed areas and that is most accurate to position the first print advertisement.

15. The computer device according to claim 14, wherein a weight parameter and a bias term parameter of a convolutional layer in the third convolutional neural network model and a weight parameter and a bias term parameter of a fully connected layer in the third convolutional neural network model are trained and generated based on a preset area that is accurate in positioning and a preset area that is inaccurate in positioning.

16. The computer device according to claim 10, wherein the computer device is an identity recognition apparatus, wherein the processor is further configured to execute the instructions to cause the identity recognition apparatus to input the target image in which the second print advertisement is embedded to a generative adversarial network model to obtain an image after style conversion, and wherein the style of the second print advertisement is consistent with a style of an image pixel outside the second print advertisement in the image after style conversion.

17. The computer device according to claim 16, wherein the generative adversarial network model comprises a generator and a discriminator, wherein the generator comprises a convolutional layer, a pooling layer, a deconvolution layer, and an anti-pooling layer, and wherein the discriminator comprises a convolutional layer, a pooling layer, a fully connected layer, and a Softmax layer.

18. The computer device according to claim 17, wherein a weight parameter and a bias term parameter of the convolutional layer in the generator and a weight parameter and a bias term parameter of the deconvolution layer in the generator are trained and generated based on a preset image in which the second print advertisement has been embedded and an image that is obtained by adjusting a style of the image in which the second print advertisement has been embedded, and wherein a weight parameter and a bias term parameter of the convolutional layer in the discriminator and a weight parameter and a bias term parameter of the fully connected layer in the discriminator are trained and generated based on the preset image in which the second print advertisement has been embedded and the image that is obtained by adjusting the style of the image in which the second print advertisement has been embedded.

19. A computer program product comprising instructions that are stored on a noni-transitory computer-readable medium and that, when executed by a processor, cause a computer device to:

determine a target image comprising P frames, wherein the target image is an image that is in M frames of images of a target video and that comprises a first print advertisement, and wherein M is a positive integer;

determine a target area in which the first print advertisement is located in the target image;

embed a second print advertisement into the target area to replace the first print advertisement;

track, using a corner point tracking algorithm and after embedding the second print advertisement, coordinates of the second print advertisement embedded in each of the P frames;

adjust, after embedding the second print advertisement, when the P frames comprise a first image in which the second print advertisement is embedded, and when a coordinate offset value of the second print advertisement is greater than or equal to a second preset threshold, the coordinates of the second print advertisement in the first image such that the coordinate offset value of the second print advertisement in the first image is less than the second preset threshold; and convert, after tracking the coordinates and adjusting the coordinates, a style of the target image in which the second print advertisement is embedded, wherein a style of the second print advertisement after style conversion is consistent with a style of an image pixel outside an area in which the second print advertisement is located in the target image.

20. The computer program product according to claim 19, wherein the computer device is an identity recognition apparatus, and wherein the instructions, when executed by the processor, further cause the identity recognition apparatus to:

recognize, based on a first convolutional neural network model, whether an $i^{th}$ frame of image in the M frames of images comprises the first print advertisement; and determine, when the $i^{th}$ frame comprises the first print advertisement, that the $i^{th}$ frame is the target image, wherein i is a positive integer ranging from 1 to M successively.

* * * * *